US008692824B2

(12) United States Patent
Rao et al.

(10) Patent No.: US 8,692,824 B2

(45) Date of Patent: Apr. 8, 2014

(54) LCD DRIVING APPARATUS AND METHOD

(75) Inventors: Yong-Nien Rao, Hsinchu (TW); Yu-Lung Lo, Banciao (TW); Chih-Yu Lee, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 1157 days.

(21) Appl. No.: 12/261,559

(22) Filed: Oct. 30, 2008

(65) Prior Publication Data

US 2009/0141016 A1 Jun. 4, 2009

(30) Foreign Application Priority Data

Nov. 30, 2007 (TW) ................................ 96145513 A

(51) Int. Cl.

*G06F 3/038* (2013.01)
*G09G 5/00* (2006.01)
*G09G 3/36* (2006.01)

(52) U.S. Cl.

USPC ................................ 345/213; 345/89; 345/96

(58) Field of Classification Search

USPC ......... 345/87, 89, 96, 98, 204, 209, 211, 690, 345/213

See application file for complete search history.

(56) References Cited

U.S. PATENT DOCUMENTS

2006/0017680 A1 * 1/2006 Chen et al. ........................ 345/96
2007/0247408 A1 * 10/2007 Nishimura et al. ............. 345/89

* cited by examiner

*Primary Examiner* — Charles V Hicks

(57) ABSTRACT

The invention discloses a driving apparatus for driving an LCD. The driving apparatus comprises a voltage control unit, an operating unit, a resistance unit, and a voltage selection unit. The operating unit comprises two sets of buffers formed by a plurality of operational amplifiers in negative feedback circuit. The two sets of buffers selectively receive positive polarity voltages and negative polarity voltages respectively. The voltage selection unit is provided with the positive polarity voltages and negative polarity voltages through the operating unit and the resistance unit. The voltage selection unit selectively provides the pixels of the LCD with the positive polarity voltage and the negative polarity voltage. Accordingly, each of the pixels is provided either with the positive polarity voltages or the negative polarity voltages by one of the two sets of buffers.

20 Claims, 9 Drawing Sheets

LCD DRIVING APPARATUS AND METHOD

BACKGROUND OF THE INVENTION

1. Field of the Invention

The invention relates to a driving apparatus and a driving method, and particularly, the invention relates to a driving apparatus and a driving method for driving an LCD.

2. Description of the Prior Art

Liquid Crystal Display (LCD) belongs to the category of flat panel display. Compared with the traditional display, such as cathode ray tube display, the LCD has advantages such as thinner thickness, lower power consumption, no radiation, and LCD is one of the major types of display in market conditions. The display principle of the LCD is inputting voltage by the driving apparatus to change the deflection of the liquid crystal molecules in order to change the polarized characteristics, so as to generate different gray levels when the light emitted by the backlight module passes through the liquid crystal. Therefore, the improvement of the driving apparatus is an important issue of LCD technology.

The driving apparatus of the LCD, especially for thin-film transistor LCD (TFT-LCD), needs buffers for avoiding input signal decaying. In general, the operational amplifiers are often used to be the buffers of the driving apparatus. An output voltage curve could be formed on the loading by providing different voltages to a plurality of buffer and connecting the buffers to the loading. On the other hand, the LCD comprises a plurality of pixels and each of the pixels displays different gray level according to the image wanted to be shown and receives the corresponding voltage from the loading according to the gray level so as to make the liquid crystal molecule corresponding to the pixel deflect to the angle needed.

When the voltage received by the liquid crystal molecule containing the same for a period of time, the characteristics of the liquid crystal molecule would be damaged and then the liquid crystal molecule could not form different gray levels through deflecting to the angles corresponding to different voltages. Therefore, when a pixel needs to show the same gray level and continues to do thus for a period of time, the characteristics of the liquid crystal molecule are easily damaged. To solve the above-mentioned problem, the display voltages of the LCD are separated to both positive and negative polarities according to a reference voltage in the prior art. The positive polarity and negative polarity voltages have one-to-one relations, and the liquid crystal molecules take turns receiving positive polarity voltages and negative polarity voltages. In other words, when a pixel keeps showing the same gray level, the pixel receives positive polarity voltage corresponding to the gray level and negative polarity voltage corresponding to the gray level, so that the liquid crystal molecule would not continuously receiving the same voltage for a long time and causes the characteristics to be damaged.

Besides, for the decreasing of crosstalk phenomenon, the adjacent pixels receive the voltages with opposite polarities. Therefore, two sets of buffers are needed for providing positive polarity and negative polarity voltages at the same time. In the prior art, positive polarity voltages are provided by one of the sets of buffers and negative polarity voltages are provided by another one of the sets of buffers, in other words, a pixel receives positive polarity and negative polarity voltages from the two sets of buffers when the pixel keeps showing the same gray level. However, because the differences of the two sets of buffers of operational amplifiers, the voltage curve formed on the loading would be changed, and when the pixel is requested to show the same gray level, the value of the positive polarity voltage received is different from the value of the negative polarity voltage received by the pixel, so as to lead to the gray level showed by the pixel would be variable, and then the image of the LCD would not meet expectancy.

SUMMARY OF THE INVENTION

Therefore, a scope of the invention is to provide a driving apparatus for the LCD to solve the above-mentioned problems.

According to an embodiment, a driving apparatus of the invention comprises a voltage control unit, an operating unit, a resistance unit and a voltage selection unit. The voltage control unit can provide N positive polarity voltages and N negative polarity voltages, wherein N is a positive integer. The operating unit comprises N first operational amplifiers and N second operational amplifiers, and each of the operational amplifiers forms a negative feedback circuit as a buffer. Each of the first operational amplifiers or the second operational amplifiers selectively receives a positive polarity voltage or a corresponding negative polarity voltage. The resistance unit comprises (N−1) first resistances and (N−1) second resistances. Each of the first resistances is coupled to the corresponding output terminal of each of the first operational amplifiers, and each of the second resistances is coupled to the corresponding output terminal of each of the second operational amplifiers. The voltage selection unit comprises M first voltage dividing points, M second voltage dividing points, M first output points and M second output points, wherein, M is a positive integer. Each of the first dividing points is electrically connected to the first resistances, and each of the second dividing points is electrically connected to the second resistances. Each of the first voltage dividing points is selectively coupled to one of the M first output points and M second output points respectively.

In this embodiment, the resistance unit and the voltage selection unit provide M positive polarity dividing voltages to the corresponding first output points and M negative polarity dividing voltages to the corresponding second output points when the first operational amplifiers receive the corresponding positive polarity voltages and the second operational amplifiers receive the corresponding negative polarity voltages. On the other hand, the resistance unit and the voltage selection unit provide M positive polarity dividing voltages to the corresponding first output points and M negative polarity dividing voltages to the corresponding second output points in the way that the first output points and the second output points switch the coupled first dividing points and the coupled second dividing points when the first operational amplifiers receive the corresponding negative polarity voltages and the second operational amplifiers receive the corresponding positive polarity voltages.

According to another embodiment, the driving apparatus is used for driving an LCD to display a plurality of continuous frames, wherein the LCD comprises a plurality of pixels. In this embodiment, the driving apparatus comprises an operating unit and a control unit. The operating unit further comprises N operational amplifiers, and each of the operational amplifiers provides a first voltage when the LCD displays a first frame of the continuous frames and provides a second voltage when the LCD displays second frame following the first frame, wherein, the polarity of the first voltage is opposite to the polarity of the second voltage, and N is a positive integer. The control unit is coupled to the N operational amplifiers and a first pixel of the pixels. The control unit selects and transforms the first voltage provided by the Kth operational amplifier of the N operational amplifiers to output a first dividing voltage to the first pixel when the LCD displays the first frame, and the control unit selects and transforms the second voltage provided by the Kth operational amplifier to output a second dividing voltage to the first pixel when the LCD displays the second frame and the gray level of the first pixel keeps the same, wherein K is a positive integer smaller than or equal to N.

Another scope of the invention is to provide a driving method for driving the LCD.

According to an embodiment, the driving method of the invention comprises the following steps: firstly, selectively providing N positive voltages and N negative voltages to N first operational amplifiers or N second operational amplifiers according to a first criterion; and then, providing (N−1) first resistances series connecting to the output terminals of the first operational amplifiers and (N−1) second resistances series connecting to the output terminals of the second operational amplifiers; finally, providing M first dividing voltage points to the first resistances and M second dividing voltage points to the second resistances, and providing M first output points and M second output points, wherein each of the first output points and the second output points is selectively coupled to one of the first dividing voltage points and the second dividing voltage points according to a second criterion. Wherein, N and M are positive integers.

According to another embodiment, the driving method of the invention is used for driving an LCD to display a plurality of continuous frames, wherein the LCD comprises a plurality of pixels. In this embodiment, the driving method comprises the following steps: firstly, N operational amplifiers providing a first voltage when the LCD displays a first frame of the continuous frames; and then, selecting and transforming the first voltage provided by the Kth operational amplifier of the N operational amplifiers to output a first dividing voltage to a first pixel; afterwards, the N operational amplifiers provide a second voltage with the polarity opposite to that of the first voltage when the LCD displays a second frame following the first frame; finally, judging if the gray level of the first pixel keeps the same, if yes, selecting and transforming the second voltage provided by the Kth operational amplifier to output a second dividing voltage to the first pixel; if no, selecting and transforming the second voltage provided by the Lth operational amplifier to output a second dividing voltage to the first pixel. Wherein, K and L are positive integers smaller than or equal to N, and K is not equal to L.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
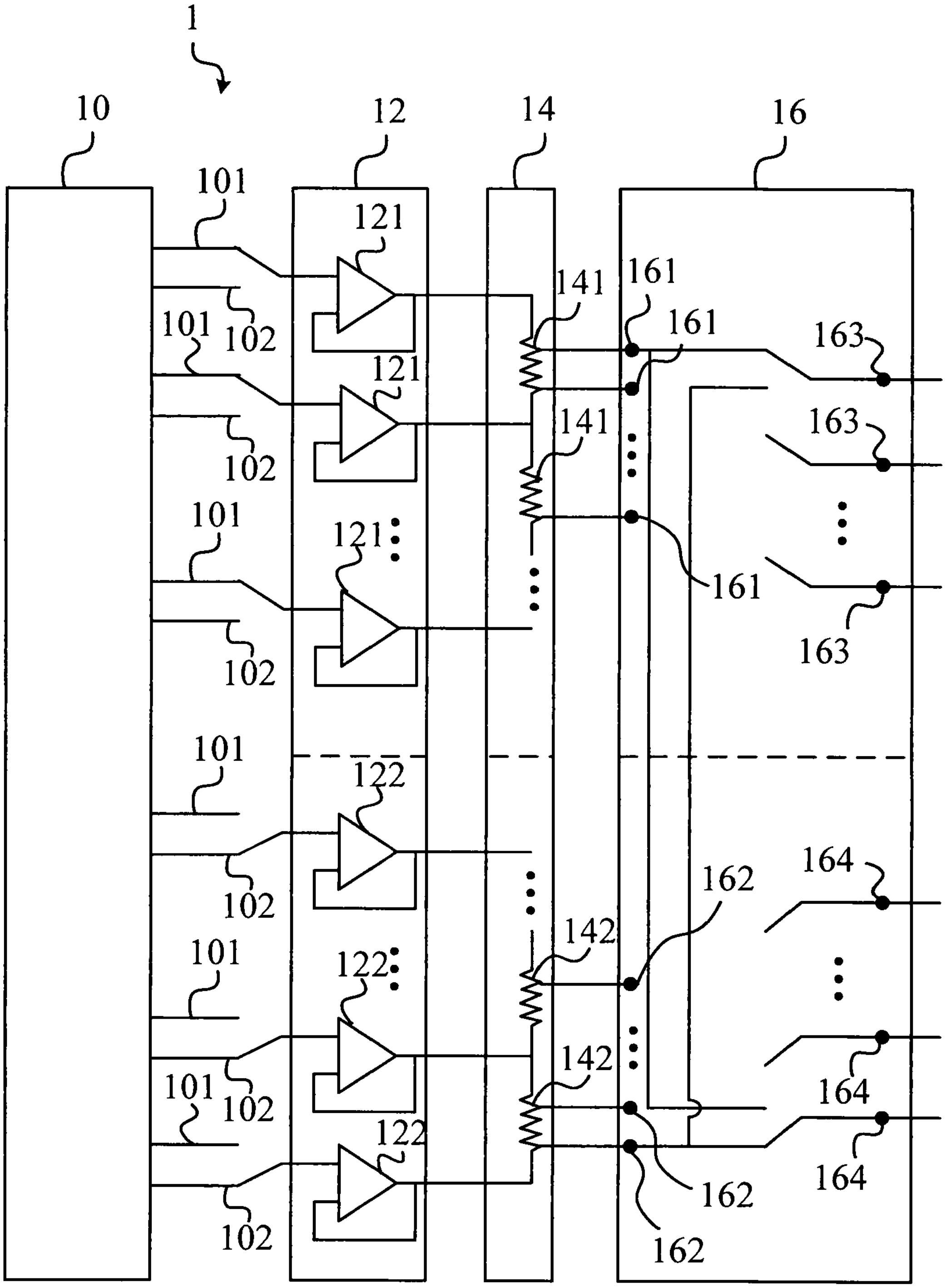
FIG. 1 is a schematic diagram illustrating a driving apparatus in an embodiment of the invention.

Please refer to FIG. 1. FIG. 1 is a schematic diagram illustrating a driving apparatus 1 in an embodiment of the invention. As shown in FIG. 1, the driving apparatus 1 comprises a voltage control unit 10, an operating unit 12, a resistance unit 14, and a voltage selection unit 16.

In this embodiment, the voltage control unit 10 can provide N positive polarity voltages 101 and N negative polarity voltages 102, wherein N is a positive integer. The output voltage outputted by the voltage control unit 10 could be determined either as a positive polarity voltage or a negative polarity voltage according to a reference voltage. For example, if the reference voltage is 6V, the voltages provided by the voltage control unit 10, which are smaller than 6V, are the negative polarity voltages; on the other hand, the voltages larger than 6V, which are provided by the voltage control unit 10, are the positive polarity voltages. In general, the voltages provided by the voltage control unit 10 are different from each other, and a corresponding relation exists between each of the positive polarity voltages and each of the negative polarity voltages.

The operating unit 12 comprises N first operational amplifiers 121 and N second first operational amplifiers 122. As shown in FIG. 1, each of the operational amplifiers can comprise a negative feedback circuit, which is to be a buffer. Each of the first operational amplifiers 121 or the second operational amplifiers 122 selectively receives one of the positive polarity voltages 101 or the corresponding negative polarity voltage 102. In practice, when one of the first operational amplifiers 121 receives a positive polarity voltage 101, one of the second operational amplifiers 122 receives a negative polarity voltage 102 that corresponds to the positive polarity voltage 101. On the other hand, when the first operational amplifier 121 receives the corresponding negative polarity voltage 102, the second operational amplifier 122 receives the positive polarity voltage 101.

The resistance unit 14 comprises (N−1) first resistances 141 and (N−1) second resistances 142. Each of the first resistances 141 is coupled to the output terminals of each of the corresponding first operational amplifiers 121, and each of the second resistances 142 is coupled to the output terminals of each of the corresponding second operational amplifiers 122. Accordingly, each of the first resistances 141 can be provided with different terminal voltages by the first operational amplifiers 121, and each of the second resistances 142 can be provided with different terminal voltage by the second operational amplifiers 122. As in the above-mentioned descriptions, a one-to-one corresponding relation exists between the positive polarity voltages and the negative polarity voltages received by the first operational amplifiers 121 and the second operational amplifiers 122, so the one-to-one corresponding relation exists between the terminal voltages of each of the first resistances 141 and those of each of the second resistances 142.

The voltage selection unit 16 comprises M first voltage dividing points 161, M second voltage dividing points 162, M first output points 163, and M second output points 164, wherein M is a positive integer. In practice, M is decided according to the gray level of the display. For example, if the display has 64 gray levels, M should be 64. Each of the first voltage dividing points 161 is electrically connected to the first resistances 141, and each of the second voltage dividing points 162 is electrically connected to the second resistance 142. Accordingly, the first voltage dividing points 161 and the second voltage dividing points 162 can obtain different dividing voltages from the first resistances 141 and the second resistances 142. Besides, a one-to-one corresponding relation exists between each of the first dividing voltages 161 and each of the second dividing voltages 162.

Furthermore, each of the first output points 163 can switch and be coupled to the corresponding first voltage dividing points 161 and the corresponding second voltage points 162. On the other hand, each of the second output points can switch and be coupled to the corresponding second voltage dividing points 162 and the corresponding first voltage points 161. A one-to-one corresponding relation exists between each of the first output points 163 and each of the second output points 164, and a corresponding relation exists between the voltage dividing points coupled to each of the first output points 163 and those coupled to each of the second output points 164. For example, when a first output point 163 is coupled to a first voltage dividing point 161, a second output 164 corresponding to the first output point 163 is coupled to a second voltage dividing point 162 corresponding to the first dividing point 161. On the other hand, when a first output point 163 is coupled to a second voltage dividing point 162, a second output point 164 corresponding to the first output point 163 is coupled to a first voltage dividing point 161 corresponding to the second voltage dividing point 162.

According to the descriptions of the above-mentioned driving apparatus 1, in this embodiment, when the first operational amplifiers 121 receive the corresponding positive polarity voltages 101 and the second operational amplifiers 122 receive the corresponding negative polarity voltages 102, the resistance unit 14 and the voltage selection unit 16 respectively provide M positive polarity dividing voltages to the corresponding first output points 163 and M negative polarity dividing voltages to the corresponding second output points 164. On the other hand, when the first operational amplifiers 121 receive the corresponding negative polarity voltages 102 and the second operational amplifiers 122 receive the corresponding positive polarity voltages 101, the resistance unit 14 and the voltage selection unit 16 respectively provide M positive polarity dividing voltages to the corresponding first output points 163 and M negative polarity dividing voltages to the corresponding second output points 164 in the way that the first output points 163 and the second output points 164 switch the coupled first dividing points 161 and the coupled second dividing points 162.

Figure 2:
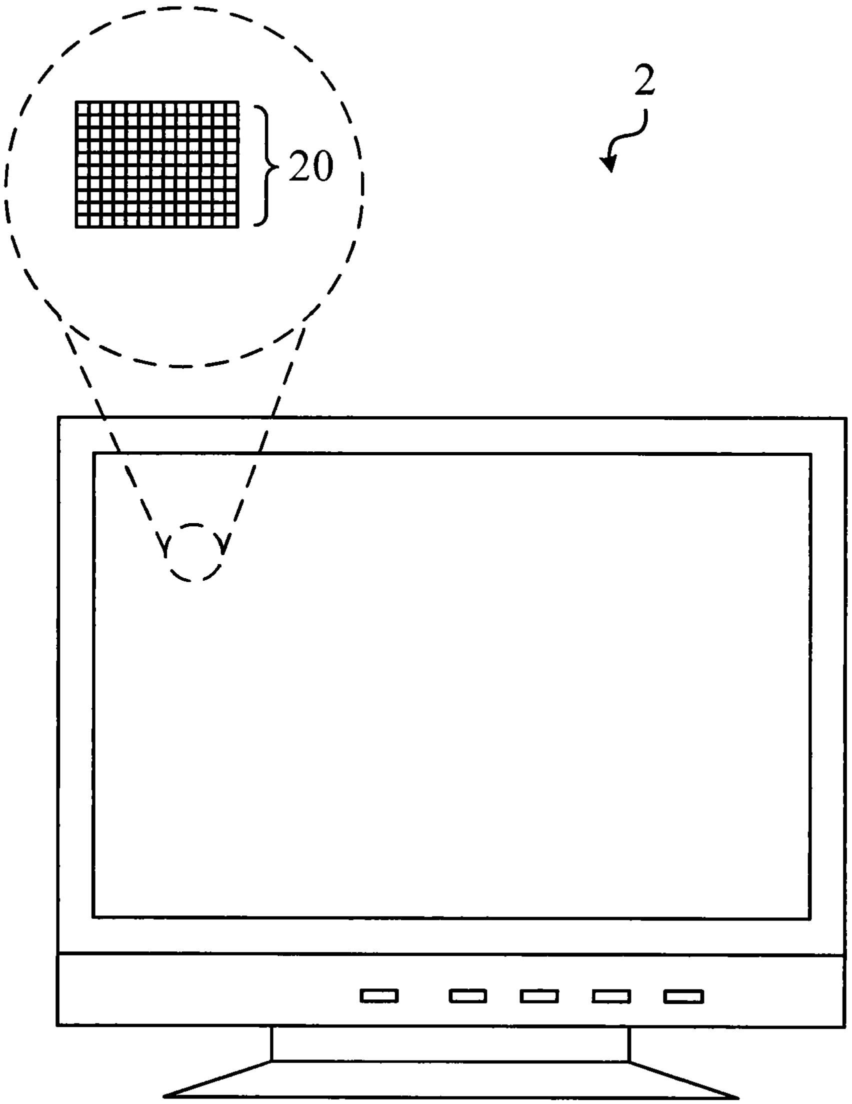
FIG. 2 is a schematic diagram illustrating an LCD according to another embodiment of the invention.
Figure 3A:
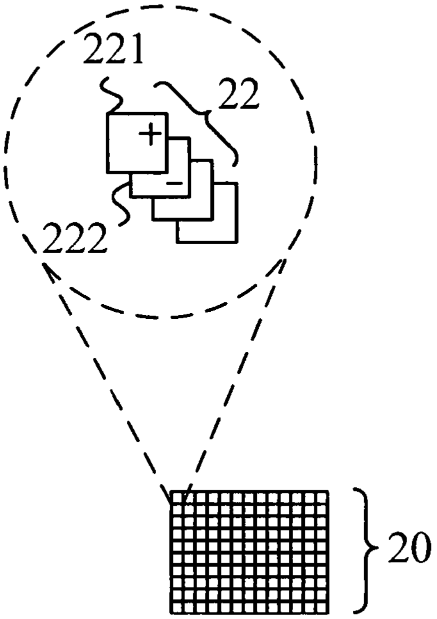
FIG. 3A is a schematic diagram illustrating that one of the plurality of pixels 20 of the LCD in FIG. 2 shows a plurality of the continuous frames.
Figure 3B:
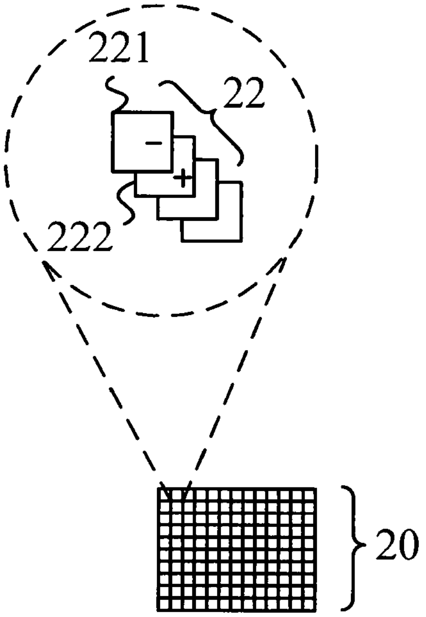
FIG. 3B is a schematic diagram illustrating that another one of the plurality of pixels of the LCD in FIG. 2 displays the plurality of continuous frames.
Figure 3C:
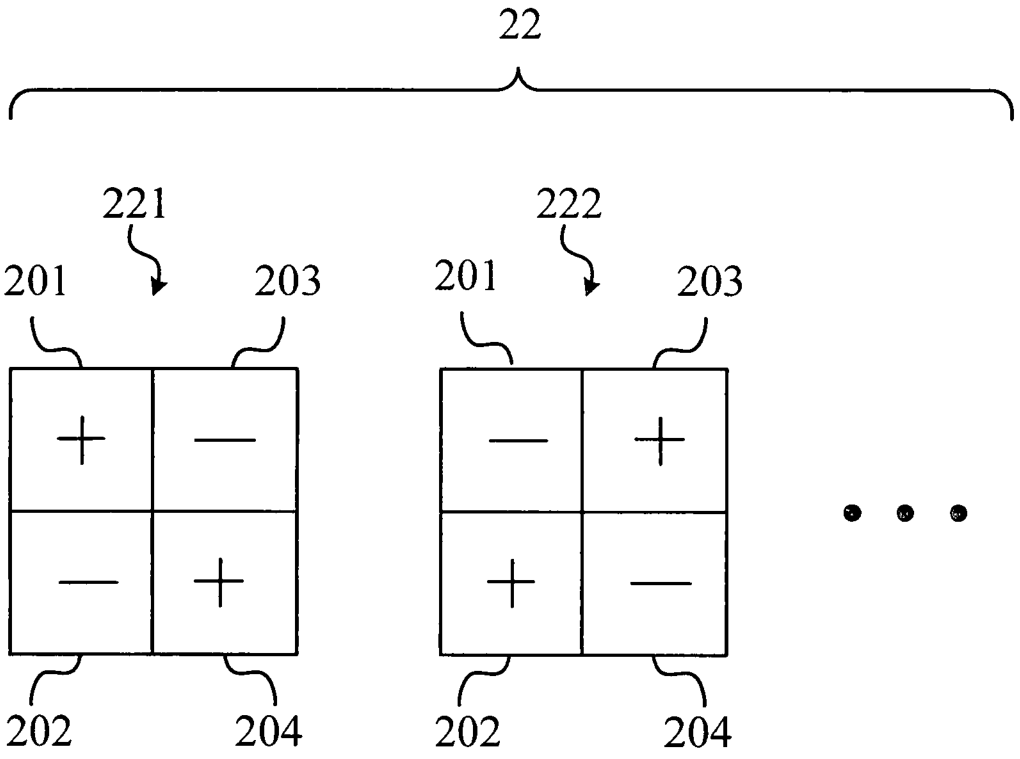
FIG. 3C is a schematic diagram illustrating that a part of the plurality of pixels of the LCD in FIG. 2 displays the plurality of continuous frames.

Please refer to FIG. 2 to FIG. 3B. FIG. 2 is a schematic diagram illustrating an LCD 2 according to another embodiment of the invention. In this embodiment, the LCD 2 is a TFT-LCD. However, in practice, LCD 2 can be other types of LCD. As shown in FIG. 2, LCD 2 comprises a plurality of pixels 20, and the LCD 2 is driven by the driving apparatus 1 in FIG. 1. FIG. 3A is a schematic diagram illustrating that one of the plurality of pixels 20 of the LCD 2 in FIG. 2 shows a plurality of the continuous frames 22; FIG. 3B is a schematic diagram illustrating that another one of the plurality of pixels 20 of the LCD 2 in FIG. 2 displays the plurality of continuous frames 22; and FIG. 3C is a schematic diagram illustrating that a part of the plurality of pixels 20 of the LCD 2 in FIG. 2 displays the plurality of continuous frames 22. It should be noted that all the pixels 20 can display the plurality of continuous frames 22, and the part of pixels 20 presents all the pixels 20 here. In this embodiment, each of the pixels 20 receives one of the positive polarity dividing voltages and negative polarity dividing voltages according to the gray level it requires.

As shown in FIG. 3A, the continuous frames comprise first frames 221 and second frames 222. The first operational amplifiers 121 of the driving apparatus 1 (as shown in FIG. 1) respectively receive the corresponding positive polarity voltages 101 and the second operational amplifiers 122 respectively receive the corresponding negative polarity voltages 102 when the pixels 20 display the first frames 221; and the first operational amplifiers 121 of the driving apparatus 1 respectively receive the corresponding negative polarity voltages 102 and the second operational amplifiers 122 respectively receive the corresponding positive polarity voltages 101 when the pixels 20 display the second frames 222 following the first frames 221. According to the above-mentioned embodiment, the first output points 163 provide M positive polarity dividing voltages and the second output points 164 provide M negative polarity dividing voltages when the pixels 20 display the first frames 221; the first output points 163 provide M negative polarity dividing voltages and the second output points 164 provide M positive polarity dividing voltages when the pixels 20 display the second frames 222. In this embodiment, a pixel 20 receives a positive polarity dividing voltage provided by the Pth first output point 163 according to the gray level it requires when the pixel 20 displays the first frame 221, wherein, the positive polarity dividing voltage provided by the Pth first output point 163 is generated by the first operational amplifiers 121, which receive the positive polarity voltages 101. Besides, the pixel 20 receives a negative polarity dividing voltage, corresponding to the positive polarity dividing voltage, provided by the Pth first output point 163 according to the gray level it requires when the pixel 20 displays the second frames 222 and the gray level required by the pixel 20 keeps the same, wherein, the negative polarity dividing voltage provided by the Pth first output point 163 is generated by the first operational amplifiers 121, which receive the negative polarity voltages 102. P is a positive integer smaller than or equal to M. Accordingly, the positive polarity dividing voltage at displaying the first frame 221 and the negative polarity dividing voltage at displaying the second frame 222 received by the pixel 20 are provided by the first operational amplifiers 121. Similarly, as shown in FIG. 3B, the positive polarity dividing voltage at displaying the first frame 221 and the negative polarity dividing voltage at displaying the second frame 222 received by another pixel 20 are provided by the second operational amplifiers 122.

As shown in FIG. 3C, the polarity of dividing voltages received by the adjacent pixels 20 is just opposite to each other. For example, if a first pixel 201 of the pixels 20 receives a positive polarity dividing voltage, a second pixel 202 and a third pixel 203 adjacent to the first pixel 201 receive negative polarity dividing voltages, and a fourth pixel 204 adjacent to the second pixel 202 and the third pixel 203 receives a positive polarity dividing voltage, and so forth. In this embodiment, when the pixels 20 display the first frame 221, the first pixel 201 receives the positive polarity dividing voltage generated by the first operational amplifiers 121, receiving the positive polarity voltages 101; the second pixel 202 receives the negative polarity dividing voltage generated by the first operational amplifiers 121, receiving the negative polarity voltages 102; the third pixel 203 receives the negative polarity dividing voltage generated by the second operational amplifiers 122, receiving the negative polarity voltages 102; the fourth pixel

204 receives the positive polarity dividing voltage generated by the second operational amplifiers 122, receiving the positive polarity voltages 102. On the other hand, when the pixels 20 display the second frame 222, the first pixel 201 receives the negative polarity dividing voltage generated by the first operational amplifiers 121, receiving the negative polarity voltages 102; the second pixel 202 receives the positive polarity dividing voltage generated by the first operational amplifiers 121, receiving the positive polarity voltages 101; the third pixel 203 receives the positive polarity dividing voltage generated by the second operational amplifiers 122, receiving the positive polarity voltages 101; the fourth pixel 204 receives the negative polarity dividing voltage generated by the second operational amplifiers 122, receiving the negative polarity voltages 102. Accordingly, the positive polarity dividing voltages and the negative polarity dividing voltages received by each of the pixels 20 are provided by the same sets of operational amplifiers at displaying the first frame 221 and the second frame 222, so as to avoid that the differences between different operational amplifiers (i.e., quality differences caused by processes) make the pixel receive different dividing voltages at the same gray level.

In practice, the gray levels required by the pixels may change when the LCD displays the first frame and the second frame, and then the positive polarity dividing voltages received by the pixels are not corresponding to the negative polarity dividing voltages received by the pixels, and all of the dividing voltages required by one pixel are still provided by the same set of operational amplifiers. For example, a pixel receives the Pth positive polarity dividing voltage provided by a third operational amplifier, and when the gray level required by the pixel changes at displaying the second frame, the pixel would receive another negative polarity dividing voltage (i.e., the Rth negative dividing voltage) from the third operational amplifier.

Figure 4A:
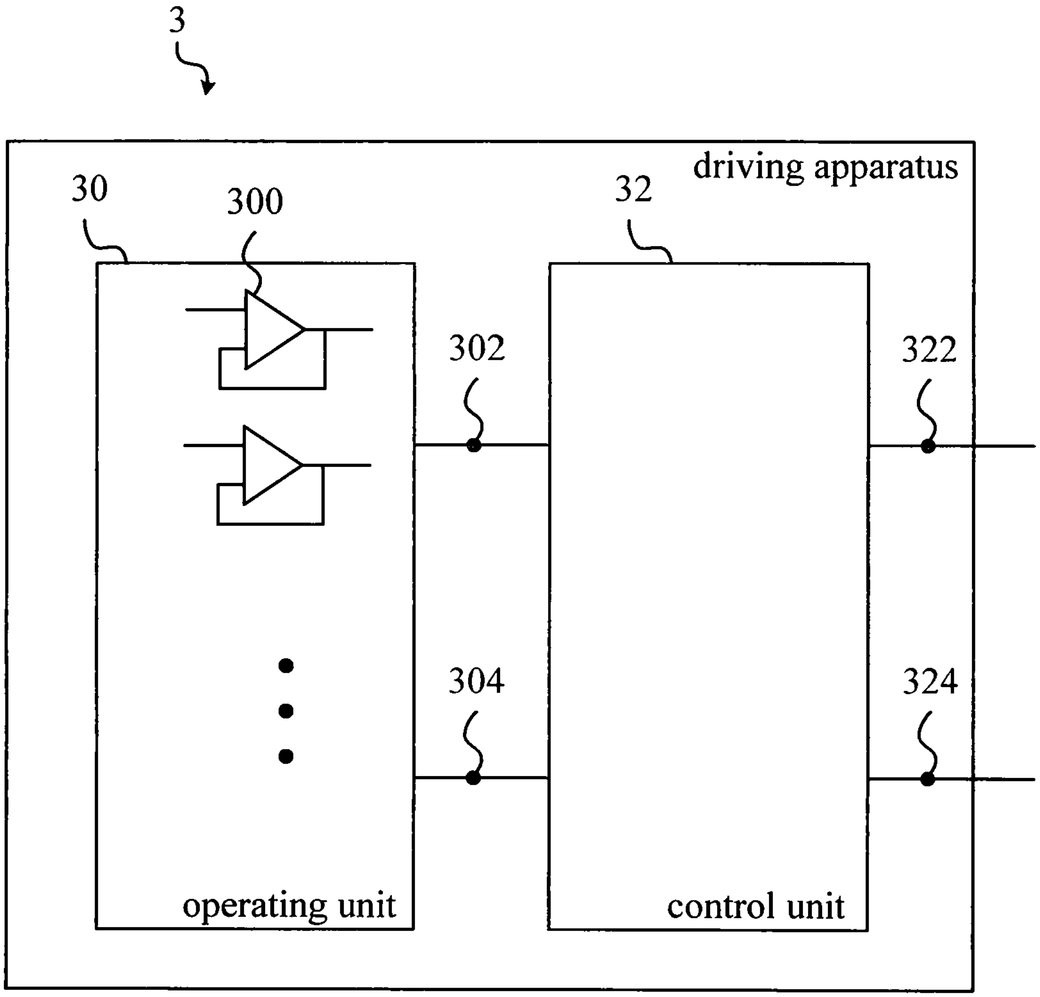
FIG. 4A is a schematic diagram illustrating a driving apparatus according to another embodiment of the invention.
Figure 4B:
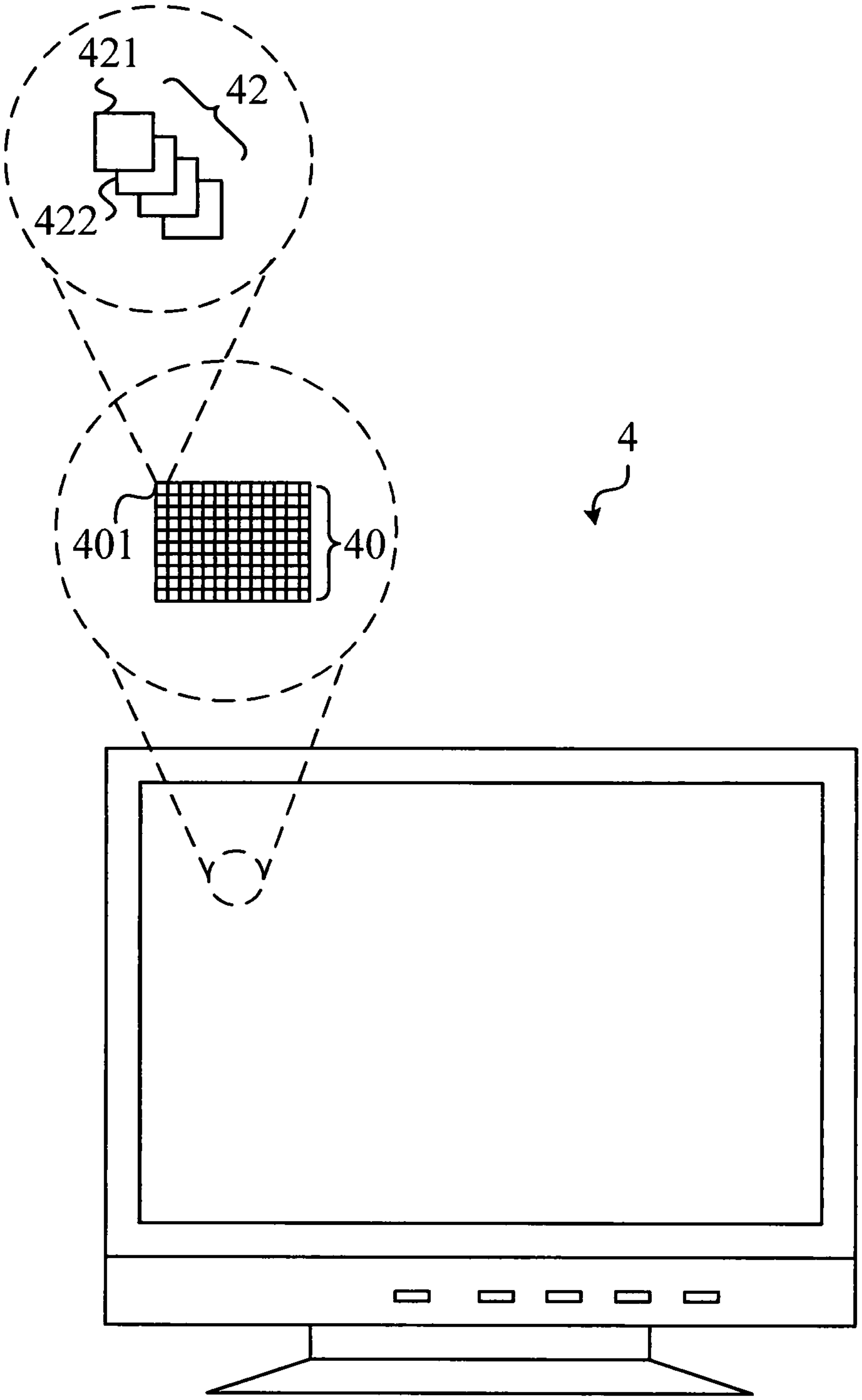
FIG. 4B is schematic diagram illustrating a TFT-LCD using the driving apparatus in FIG. 4A.

Please refer to FIG. 4A and FIG. 4B. FIG. 4A is a schematic diagram illustrating a driving apparatus 3 according to another embodiment of the invention, and FIG. 4B is schematic diagram illustrating a TFT-LCD 4 using the driving apparatus 3 in FIG. 4A. As shown in FIG. 4A, the driving apparatus 3 comprises an operating unit 30 and a control unit 32. The operating unit 30 comprises N operational amplifiers 300, and similarly, each of the operational amplifiers 300 forms a negative feedback circuit, wherein N is a positive integer. Each of the operational amplifiers 300 provides a first voltage 302 when the TFT-LCD 4 displays a first frame 421 of continuous frames 42, and provides a second voltage 304 when the TFT-LCD 4 displays a second frame 422 following the first frame 421, wherein the polarity of the first voltage 302 is opposite to the polarity of the second voltage 304. The control unit 32 is coupled to the N operational amplifiers 300 and a first pixel 401 of pixels 40 of the TFT-LCD 4, wherein the control unit 32 selects and transforms the first voltage 302 provided by the Kth operational amplifier 300 of the operational amplifiers 300 to output a first dividing voltage 322 to the first pixel 401 when the TFT-LCD 4 displays the first frame 421; wherein the control unit 32 selects and transforms the second voltage 304 provided by the Kth operational amplifier 300 to output a second dividing voltage 324 to the first pixel 401 when the TFT-LCD 4 displays the second frame 422 and a gray level of the first pixel 401 is kept the same. K is a positive integer smaller than or equal to N.

Furthermore, in another embodiment, the driving apparatus can further comprise a voltage control unit (not shown in the figure) for providing the first voltage 302 or the second voltage 304 to the operational amplifiers 300.

Figure 5:
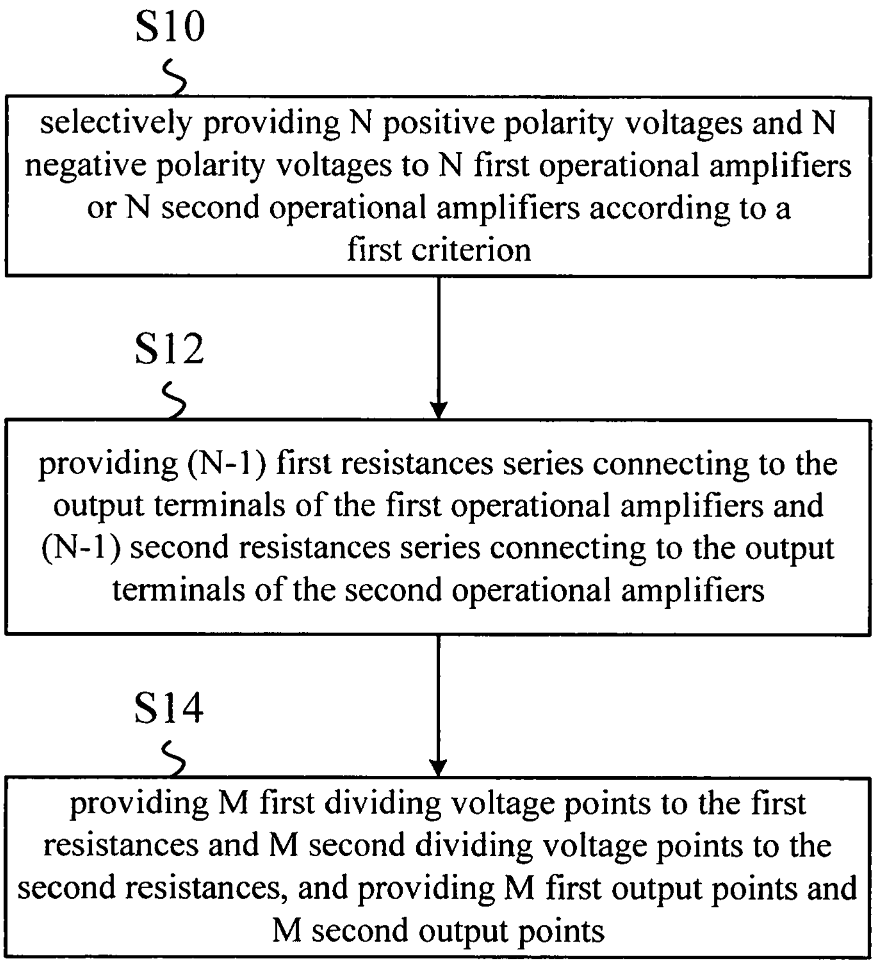
FIG. 5 is a flow chart illustrating a driving method according to an embodiment of the invention.

Please refer to FIG. 5. FIG. 5 is a flow chart illustrating a driving method according to an embodiment of the invention. As shown in FIG. 5, the driving method of the embodiment is used for driving an LCD, and the driving method comprises the following steps: firstly, in step S10, selectively providing N positive polarity voltages and N negative polarity voltages to N first operational amplifiers or N second operational amplifiers, according to a first criterion; and then, in step S12, providing (N−1) first resistances series connecting to the output terminals of the first operational amplifiers and (N−1) second resistances series connecting to the output terminals of the second operational amplifiers; finally, in step S14, providing M first dividing voltage points to the first resistances and M second dividing voltage points to the second resistances, and providing M first output points and M second output points, wherein each of the first output points and the second output points is selectively coupled to one of the first dividing voltage points and the second dividing voltage points, according to a second criterion. M and N in the steps are positive integers, and the magnitude of M and N are designed according to practical applications.

For example, in general practice, N is 7, and it means that 7 first operational amplifiers, 7 second operational amplifiers, 6 first resistances, and 6 second resistances are inputted by 7 first voltages and 7 second voltages with different voltage values to provide different dividing voltages to each of the first dividing points and the second dividing points. Besides, M is, in general, 64, and it means that 64 first dividing points and 64 second dividing points are coupled to the first resistances and the second resistances to provide two sets of 64 different dividing voltages. The two sets of dividing voltages are provided to the pixels for displaying 64 gray levels.

In this embodiment, the LCD driven by the driving method can display a plurality of continuous frames. The first criterion of this embodiment can comprise: the first operational amplifiers that receive the corresponding positive polarity voltages respectively, and the second operational amplifiers that receive the corresponding negative polarity voltages, respectively when the LCD displays a first frame of the continuous frames, and the first operational amplifiers can receive the corresponding negative polarity voltages respectively and the second operational amplifiers can receive the corresponding positive polarity voltages respectively when the LCD displays a second frame following the first frame.

Furthermore, The second criterion of this embodiment can comprise: the first output points can be coupled to the corresponding first dividing points respectively and output M positive polarity dividing voltages, and the second output points can be coupled to the corresponding second dividing points and output M negative polarity dividing voltages when the LCD displays the first frame, and the first output points can be coupled to the corresponding second dividing points and output the positive polarity dividing voltages and the second output points can be coupled to the corresponding first dividing points and output M negative polarity dividing voltages when the LCD displays the second frame.

In this embodiment, each of the pixels receives one of the positive polarity dividing voltages or one of the negative polarity dividing voltages according to the present gray level required by the pixel. It should be noticed that the dividing voltages required by the pixel are provided by the same set of the operational amplifiers no matter the dividing voltages are positive polarity or negative polarity. For example, a pixel receives the Pth positive polarity dividing voltage according to the gray level required by the pixel when the LCD displays the first frame, wherein the Pth positive polarity dividing voltage is generated by the first operational amplifiers receiving the positive polarity voltages, and when the LCD displays the second frame and the gray level required by the first pixel is kept the same, the Pth negative polarity dividing voltage received by the pixel is still generated by the first operational amplifiers receiving the negative polarity voltages. P is a positive integer smaller than or equal to M.

Similarly, a pixel receives the Qth negative polarity dividing voltage according to the gray level required by the pixel when the LCD displays the first frame, wherein the Qth negative polarity dividing voltage is generated by the second operational amplifiers receiving the negative polarity voltages, and when the LCD displays the second frame and the gray level required by the first pixel is kept the same, the Qth positive polarity dividing voltage received by the pixel is still generated by the second operational amplifiers receiving the positive polarity voltages. Q is a positive integer smaller than or equal to M.

In practice, when the LCD displays the first frame and the second frame, the gray level required by each of the pixels may change to make the positive polarity dividing voltage required by the pixel fail to correspond to negative polarity dividing voltage required by the pixel, and the dividing voltages required by the pixel are still provided by the same sets of the operational amplifiers. For example, a pixel receives the Pth positive polarity dividing voltage provided by a third operational amplifier, and the gray level required by the pixel changes when the LCD displays the second frame, the pixel receives another negative polarity dividing voltage (i.e., the Rth negative polarity voltage) excepting Pth negative polarity dividing voltage, and the negative polarity dividing voltage is still provided by the third operational amplifier.

Figure 6A:
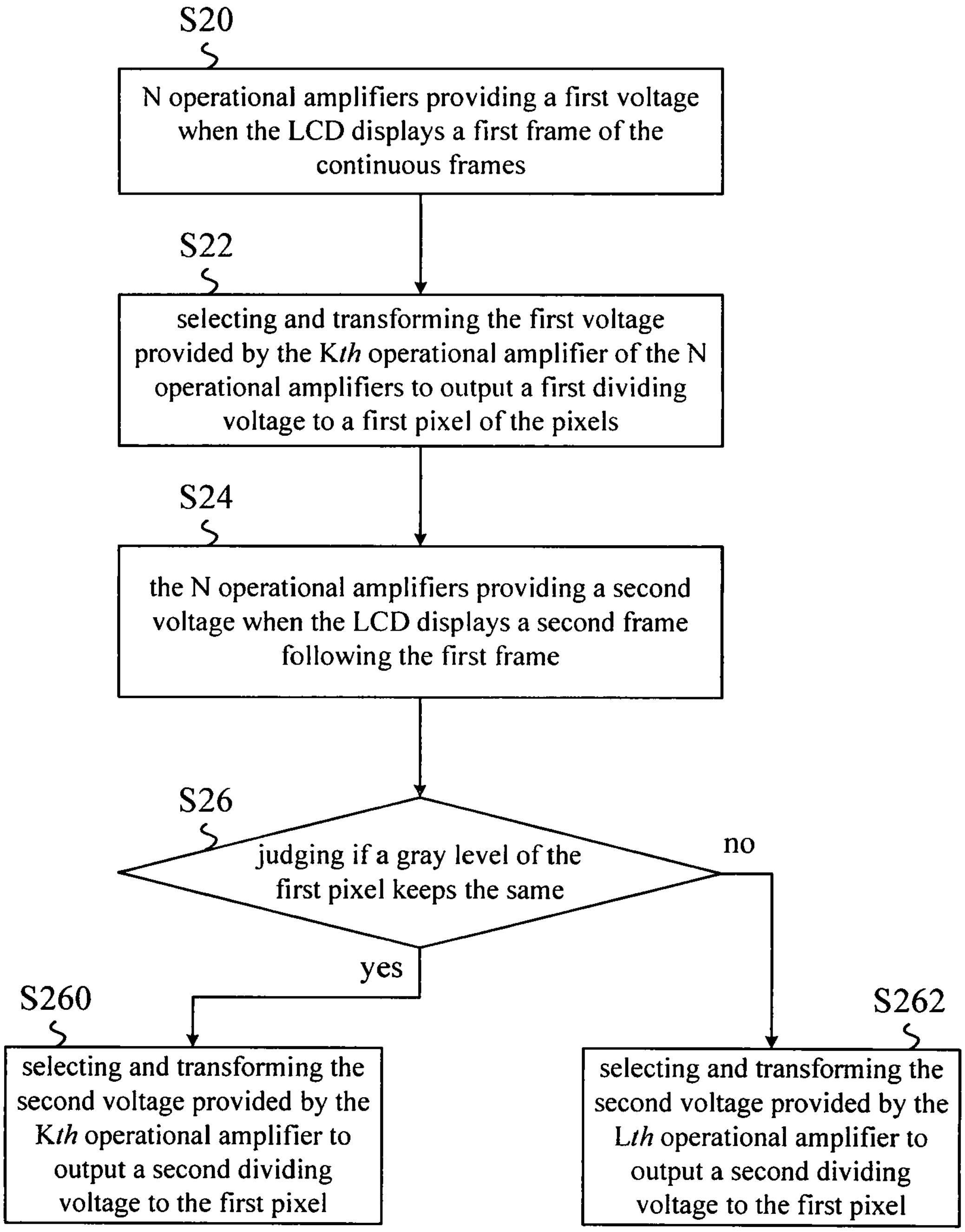
FIG. 6A is a flow chart illustrating a driving according to another embodiment of the invention.

Please refer to FIG. 6A. FIG. 6A is a flow chart illustrating a driving method according to another embodiment of the invention. The driving method is used to drive an LCD to display a plurality of continuous frames, and the LCD comprises a plurality of pixels as seen in the above-mentioned embodiment. The driving method comprises the following steps: firstly, in step S20, N operational amplifiers providing a first voltage when the LCD displays a first frame of the continuous frames; and then, in step S22, selecting and transforming the first voltage provided by the Kth operational amplifier of the N operational amplifiers to output a first dividing voltage to a first pixel of the pixels; and then, in step S24, the N operational amplifiers providing a second voltage when the LCD displays a second frame following the first frame, wherein the polarity of the first voltage is opposite to the polarity of the second voltage; finally, in step S26, judging if a gray level of the first pixel keeps the same, and if yes, in step S260, selecting and transforming the second voltage provided by the Kth operational amplifier to output a second dividing voltage to the first pixel, and if no, in step S262, selecting and transforming the second voltage provided by the Lth operational amplifier to output a second dividing voltage to the first pixel. N, K, and L are positive integers, wherein K and L are smaller than or equal to N while not equal to each other.

Figure 6B:
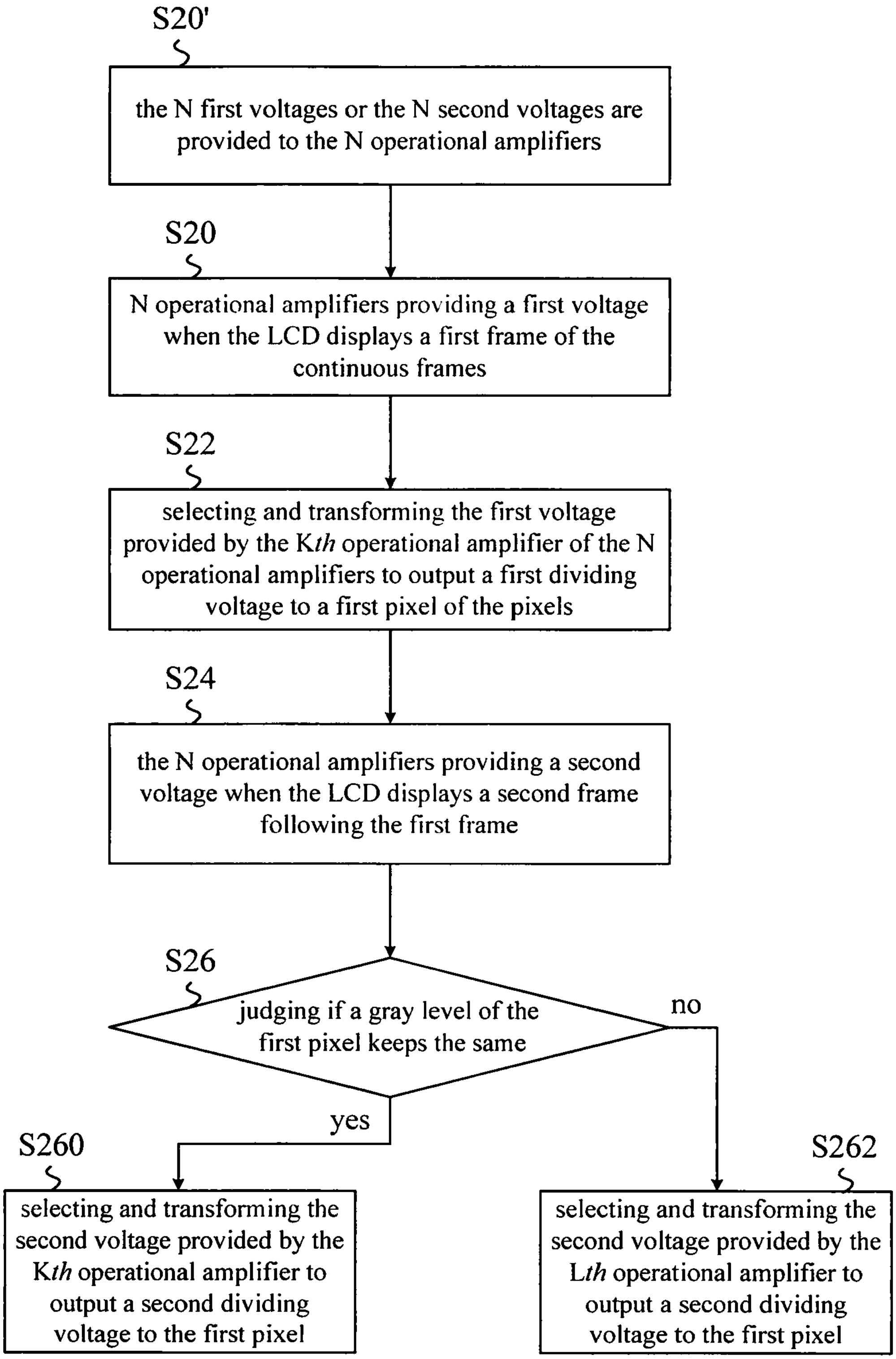
FIG. 6B is a flow chart illustrating a driving method according to another embodiment of the invention.

Please refer to FIG. 6B. FIG. 6B is a flow chart illustrating a driving method according to another embodiment of the invention. The difference between this embodiment and the above-mentioned embodiment is that the driving method of this embodiment further comprises step S20'. Step S20' is before step S20 and in step S20, the N first voltages or the N second voltages are provided to the N operational amplifiers. The other parts of this embodiment are the same with those of the above-mentioned embodiment, and those are not described here.

Compared with the prior art, the pixels of the LCD driving apparatus and driving method of the invention receive voltages provided by the same set of operational amplifiers when displaying. Accordingly, the corresponding voltages, of different polarities, received by the pixels can be prevented from being displaced which is caused by the differences between different sets of operational amplifiers, and then the gray levels required by the pixels would not be inconstant due to receiving displacements of the corresponding voltages with different polarities.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A driving apparatus for driving a liquid crystal display, with the driving apparatus comprising:

a voltage control unit for providing N positive polarity voltages and N negative polarity voltages, N being a positive integer;

an operating unit, comprising N first operational amplifiers and N second operational amplifiers coupled to the voltage control unit;

a resistance unit, comprising (N−1) first resistances and (N−1) second resistances, the first resistances being coupled to the output terminals of the first operational amplifiers respectively, the second resistances being coupled to the output terminals of the second operational amplifiers respectively; and a voltage selection unit, comprising M first voltage dividing points and M second voltage dividing points, and the M first voltage dividing points and the M second voltage dividing points being disposed in the voltage selection unit instead of being disposed in the resistance unit, the first voltage dividing points connecting to the first resistances, the second voltage dividing points connecting to the second resistances, each of the first voltage dividing points and each of the second voltage dividing points being selectively coupled to one of M first output points and M second output points respectively, M being a positive integer;

wherein, the resistance unit and the voltage selection unit provide M positive polarity dividing voltage to the corresponding first output points and M negative polarity dividing voltage to the corresponding second output points when the first operational amplifiers receive the corresponding positive polarity voltages and the second operational amplifiers receive the corresponding negative polarity voltages; wherein, the resistance unit and the voltage selection unit provide M positive polarity dividing voltages to the corresponding first output points and M negative polarity dividing voltages to the corresponding second output points in the way that the first output points and the second output points switch the coupled first dividing points and the coupled second dividing points when the first operational amplifiers receive the corresponding negative polarity voltages and the second operational amplifiers receive the corresponding positive polarity voltages.

2. The driving apparatus of claim 1, wherein the liquid crystal display displays a plurality of continuous frames, the first operational amplifiers receiving the corresponding positive polarity voltages and the second operational amplifiers receiving the corresponding negative polarity voltages when the liquid crystal display displays a first frame of the continuous frames, and the first operational amplifiers receiving the corresponding negative polarity voltages and the second operational amplifiers receiving the corresponding positive polarity voltages when the liquid crystal display displays a second frame following the first frame.

3. The driving apparatus of claim 2, wherein the liquid crystal display further comprises a plurality of pixels, and each of the pixels receives one of the positive polarity dividing voltages or the negative polarity dividing voltages according to a gray level required by itself.

4. The driving apparatus of claim 3, wherein a first pixel of the pixels receives the Pth positive polarity dividing voltage provided by the Pth first output point according to the gray level required by itself when the liquid crystal display displays the first frame, the Pth positive polarity dividing voltage provided by the Pth first output point is generated by the first operational amplifiers receiving the positive polarity voltages, and the first pixel receives the Pth negative polarity dividing voltage, provided by the Pth first output point, corresponding to the Pth positive polarity dividing voltage when the liquid crystal display displays the second frame and the gray level required by the first pixel is kept the same, the Pth negative polarity dividing voltage provided by the Pth first output point is generated by the first operational amplifiers receiving the negative polarity voltages, P being a positive integer smaller than or equal to M.

5. The driving apparatus of claim 3, wherein a second pixel of the pixels receives a Qth negative polarity dividing voltage provided by the Qth second output point according to the gray level required by itself when the liquid crystal display displays the first frame, the Qth negative polarity dividing voltage provided by the Qth second output point is generated by the second operational amplifiers receiving the negative polarity voltages, and the first pixel receives the Qth positive polarity dividing voltage, provided by the Qth second output point, corresponding to the Qth negative polarity dividing voltage when the liquid crystal display displays the second frame and the gray level required by the second pixel is kept the same, the Qth positive polarity dividing voltage provided by the Qth second output point is generated by the second operational amplifiers receiving the positive polarity voltages, Q being a positive integer smaller than or equal to M.

6. The driving apparatus of claim 1, wherein the first operational amplifier and the second operational amplifier respectively comprise a negative feedback circuit.

7. The driving apparatus of claim 1, wherein the liquid crystal display is a thin film transistor liquid crystal display.

8. A driving apparatus for driving a liquid crystal display to display a plurality of continuous frames, wherein the liquid crystal display comprises a plurality of pixels, the driving apparatus comprising:

an operating unit comprising N operational amplifiers, and each of the operational amplifiers providing a first voltage when the liquid crystal display displays a first frame of the continuous frames, and providing a second voltage when the liquid crystal display displays a second frame following the first frame, wherein the polarity of the first voltage is opposite to the polarity of the second voltage, N being a positive integer; and a control unit, coupled to the N operational amplifiers and a first pixel of the pixels, wherein the control unit selects and transforms the first voltage provided by the Kth operational amplifier of the N operational amplifiers to output a first dividing voltage to the first pixel when the liquid crystal display displays the first frame; wherein the control unit selects and transforms the second voltage provided by the Kth operational amplifier to output a second dividing voltage to the first pixel when the liquid crystal display displays the second frame and a gray level of the first pixel is kept the same, K is a positive integer smaller than or equal to N, and the polarity of the first dividing voltage is opposite to the polarity of the second dividing voltage, the control unit comprises a resistance unit and a voltage selection unit, the resistance unit comprises a plurality of resistances coupled to output terminals of the operational amplifiers respectively; the voltage selection unit comprises M first voltage dividing points and M second voltage dividing points disposed in the voltage selection unit instead of being disposed in the resistance unit, M is a positive integer.

9. The driving apparatus of claim 8, further comprising:

a voltage control unit for providing the N first voltages or the N second voltages to the N operational amplifiers.

10. The driving apparatus of claim 8, wherein each of the operational amplifiers comprises a negative feedback circuit.

11. The driving apparatus of claim 8, wherein the liquid crystal display is a thin film transistor liquid crystal display.

12. A driving method for driving a liquid crystal display, the driving method comprising the following steps:

(A) selectively providing N positive polarity voltages and N negative polarity voltages to N first operational amplifiers or N second operational amplifiers according to a first criterion, N being a positive integer;

(B) providing a resistance unit comprising (N−1) first resistances series connecting to the output terminals of the first operational amplifiers and (N−1) second resistances series connecting to the output terminals of the second operational amplifiers; and (C) providing a voltage selection unit comprising M first dividing voltage points to the first resistances and M second dividing voltage points to the second resistances, disposing the M first voltage dividing points and the M second voltage dividing points in the voltage selection unit instead of disposing the M first voltage dividing points and the M second voltage dividing points in the resistance unit, and providing M first output points and M second output points, wherein each of the first output points and the second output points is selectively coupled to one of the first dividing voltage points and the second dividing voltage points according to a second criterion, M being a positive integer.

13. The driving method of claim 12, wherein the liquid crystal display displays a plurality of continuous frames, and the first criterion comprises that the first operational amplifiers receive the corresponding positive polarity voltages and the second operational amplifiers receive the corresponding negative polarity voltages when the liquid crystal display displays a first frame of the continuous frames, and the first operational amplifiers receive the corresponding negative polarity voltages and the second operational amplifiers receive the corresponding positive polarity voltages when the liquid crystal display displays a second frame following the first frame.

14. The driving method of claim 13, wherein the second criterion comprises that the first output points are coupled to the corresponding first dividing points and output M positive polarity dividing voltages and the second output points are coupled to the corresponding second dividing points and output M negative polarity dividing voltages when the liquid crystal display displays the first frame, and the first output points are coupled to the corresponding second dividing points and output the positive polarity dividing voltages and the second output points are coupled to the corresponding first dividing points and output M negative polarity dividing voltages when the liquid crystal display displays the second frame.

15. The driving method of claim 13, wherein the liquid crystal display further comprises a plurality of pixels, and each of the pixels receiving one of the positive polarity dividing voltages or one of the negative polarity dividing voltages according to a gray level required by itself.

16. The driving method of claim 15, wherein a first pixel of the pixels receives the Pth positive polarity dividing voltage provided by the Pth first output point according to the gray level required by itself when the liquid crystal display displays the first frame, the Pth positive polarity dividing voltage provided by the Pth first output point is generated by the first operational amplifiers receiving the positive polarity voltages, and the first pixel of the pixels receives the Pth negative polarity dividing voltage, provided by the Pth first output point, corresponding to the Pth positive polarity dividing voltage when the liquid crystal display displays the second frame and the gray level required by the first pixel is kept the same, the Pth negative polarity dividing voltage provided by the Pth first output point is generated by the first operational amplifiers receiving the negative polarity voltages, P is a positive integer smaller than or equal to M.

17. The driving method of claim 15, wherein a second pixel of the pixels receives the Qth negative polarity dividing voltage provided by the Qth second output point according to the gray level required by itself when the liquid crystal display displays the first frame, the Qth negative polarity dividing voltage provided by the Qth second output point is generated by the second operational amplifiers receiving the negative polarity voltages, and the first pixel of the pixels receives the Qth positive polarity dividing voltage, provided by the Qth second output point, corresponding to the Qth negative polarity dividing voltage when the liquid crystal display displays the second frame and the gray level required by the second pixel is kept the same, the Qth positive polarity dividing voltage provided by the Qth second output point is generated by the second operational amplifiers receiving the positive polarity voltages, Q is a positive integer smaller than or equal to M.

18. A driving method for driving a liquid crystal display to display a plurality of continuous frames, wherein the liquid crystal display comprises a plurality of pixels, the driving method comprising the following steps:

N operational amplifiers providing a first voltage when the liquid crystal display displays a first frame of the continuous frames, N being a positive integer;

selecting and transforming the first voltage provided by the Kth operational amplifier of the N operational amplifiers to output a first dividing voltage to a first pixel, K being a positive integer smaller than or equal to N;

the N operational amplifiers providing a second voltage when the liquid crystal display displays a second frame following the first frame, wherein the polarity of the first voltage is opposite to the polarity of the second voltage;

providing a resistance unit comprising resistances series connecting to output terminals of the operational amplifiers;

providing a voltage selection unit comprising M first dividing voltage points and M second dividing voltage points, M is a positive integer;

disposing the M first voltage dividing points and the M second voltage dividing points in the voltage selection unit instead of disposing the M first voltage dividing points and the M second voltage dividing points in the resistance unit; and judging if a gray level of the first pixel is kept the same, and if yes, selecting and transforming the second voltage provided by the Kth operational amplifier to output a second dividing voltage to the first pixel, wherein the polarity of the first dividing voltage is opposite to the polarity of the second dividing voltage.

19. The driving method of claim 18, wherein step (D) further comprises the following step:

(D1) judging if a gray level of the first pixel is kept the same, and if no, selecting and transforming the second voltage provided by the Lth operational amplifier to output a second dividing voltage to the first pixel, L being a positive integer, not equal to K, which is smaller than or equal to N.

20. The driving method of claim 18, further comprising the following step:

(A') providing N first voltages or N second voltages to the N operational amplifiers.

* * * * *